(No Model.)

G. D. BURTON.
STOCK CAR.

No. 359,345. Patented Mar. 15, 1887.

WITNESSES
Jos. A. Ryan
Edwin L. Jewell.

INVENTOR
Geo. D. Burton
By Chas E. Barber
His Attorney in fact

UNITED STATES PATENT OFFICE.

GEORGE D. BURTON, OF NEW IPSWICH, NEW HAMPSHIRE.

STOCK-CAR.

SPECIFICATION forming part of Letters Patent No. 359,345, dated March 15, 1887.

Application filed September 13, 1886. Serial No. 213,373. (No model.)

*To all whom it may concern:*

Be it known that I, GEORGE D. BURTON, a citizen of the United States, residing at New Ipswich, in the county of Hillsborough and State of New Hampshire, have invented a new and useful Improvement in Stock - Cars, of which the following is so full, clear, and exact a description as will enable others skilled in the art to which my invention appertains to make and use the same, reference being had to the accompanying drawings, in which—

Figure 1:
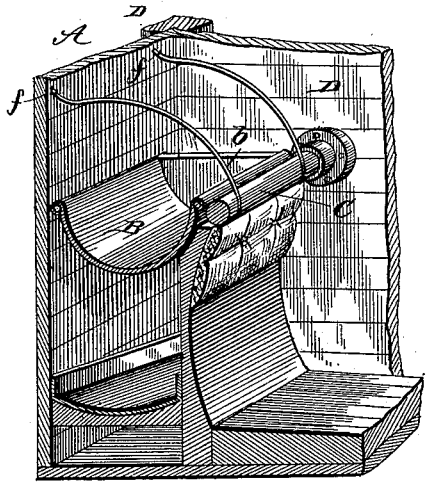
Figure 2:
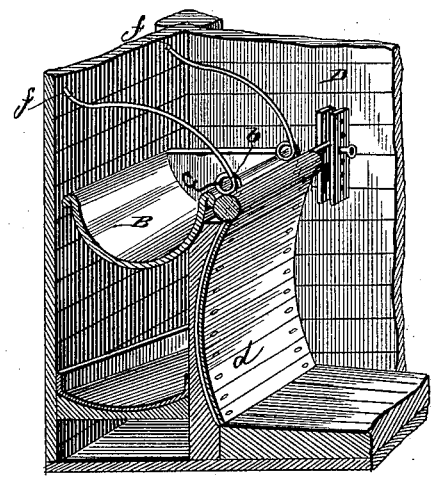
Figure 3:
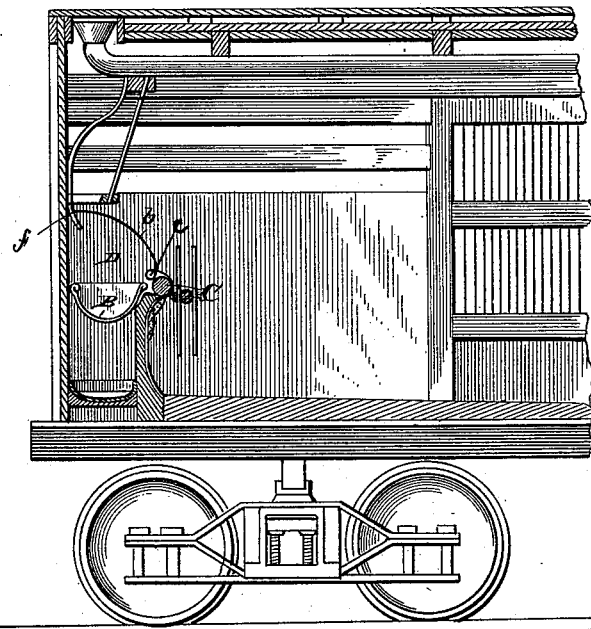

Figure 1 is a perspective view of a portion of a car embodying my invention. Fig. 2 is a similar view of another form of carrying out my invention. Fig. 3 is another view of my improved device, showing the relative height of the car and top of the manger.

The object of my invention is to provide a stock-car in which stock may be carried without liability of the animals getting into the trough.

Another object of my invention is to provide a stock-car with a trough and knee-board, which latter will be strong and not liable to get out of order.

Another object of my invention is to construct a stock-car for the transportion of stock and provide the same with a cross-beam, which may be adjusted vertically to accommodate animals of different heights.

In the drawings, the car A has the trough B, pivotally secured at *b* in position, either in the end of the car or near the central partition thereof, where there is a trough placed in the middle of the car. In front of the trough B is a bar, C, which serves to protect the trough against accidental displacement, and which also serves to brace the partitions of the car and hold them firmly together. The bar C is held in place and against accidental displacement by the guards D D, which in turn are secured at their upper ends by the staples or eyebolts *f*, as shown in Figs. 1 and 2. This guard D will serve to protect the trough against injury, and will also prevent the animals from getting over into the trough.

In the construction shown in Fig. 2 the guards D are given a small twist at *c* to form a loop through which to fasten a rope when it is desired to secure the animals in place in the car. These guards then extend out over the front bar, C, and thence down in a curved line below the line of the bar C to the floor. To this rod the boards *d* are secured by suitable eyebolts, rivets, or by any other device which it may be desired to employ in this connection.

In Fig. 1 I show padding E, which is designed to prevent the animals from bruising their knees against the front of the trough or against that part of the partition which is covered by the cushion.

In Fig. 2 I show perforated guides F, the perforations of which register with a corresponding perforation in the guard-rail or cross-bar C. This facilitates the vertical adjustment of the cross-bar when it is desired to accommodate animals of different heights.

Heretofore some difficulty has been experienced in the shipment of horses in that the horses would rear up or kick over the partitions between the animals. This I entirely obviate by constructing the stalls the entire height of the car, or by placing the boards G G up in and across the car between the animals. This does away with all necessity for devices for holding the animals down and frees them entirely from the worry of such device or devices. The beams C may be mounted in horizontal slots and made adjustable in these slots also.

Having now described the objects, uses, and advantages of my invention, what I desire to secure by Letters Patent, and what I therefore claim, is—

1. In a stock-car of the character described, the combination of the pivoted trough, the cross-bar, and a series of guards, which prevent the animals from getting into the trough, substantially as and for the purposes specified.

2. In a stock-car of the character described, the trough pivotally secured in the car, the guard for the trough, and the cushioned padding secured to the curved partition to prevent the animals from bruising their knees, substantially as and for the purposes specified.

3. In a stock-car of the character described, the combination of the pivoted trough, the beam, the guards, and the partition, said guards extending over the trough and down in front of the same and thence down in a backward curve, forming a support for the boards which cover the curved portion in front of the stall, substantially as described.

4. In a stock-car, the combination of the trough, the rail in front of the trough, and the partition below the latter, with the guards having the secondary curves in them to form a loop to which to secure the animals, substantially as described.

5. In a stock-car of the character described, the combination of the trough and the vertical adjustable cross-beam, substantially as described.

In testimony that I claim the above I hereunto set my hand and affix my seal in presence of two subscribing witnesses.

GEO. D. BURTON. [L. S.]

Witnesses:
 M. V. LIVINGSTON,
 W. S. BOYDEN.